United States Patent [19]
Ryham

[11] 4,302,281
[45] Nov. 24, 1981

[54] METHOD FOR PRODUCING PULP

[75] Inventor: Rolf Ryham, Balsta, Sweden

[73] Assignee: AB Rosenblads Patenter, Stockholm, Sweden

[21] Appl. No.: 70,501

[22] Filed: Aug. 28, 1979

[30] Foreign Application Priority Data

Aug. 30, 1978 [SE] Sweden ................................ 7809167

[51] Int. Cl.³ ............................................. D21C 11/04
[52] U.S. Cl. ................................. 162/30 K; 423/183; 423/DIG. 3
[58] Field of Search .......... 162/30 R, 30 K, DIG. 10; 423/183, DIG. 3

[56] References Cited

PUBLICATIONS

Chemical Recovery in Alkaline Pulping Processes, Whitney (Editor) Tappi Monograph No. 32, 1968, pp. 13, 103–117, 121–124.
Pulping Process, Rydholm, 1965, pp. 798–802.
Computer Control in the Recovery Area of Kraft Process, Uronen, Tappi, Nov. 1978, U of 61, No. 11, pp. 57–61.
Modelling and Simulation of Cantiiyation Plant and Lime Kiln, Uronen et al. Pulp & Paper Canada, Jun. 6, 1979, vol. 80, No. 6, pp. 90–93.

*Primary Examiner*—Peter F. Kratz
*Attorney, Agent, or Firm*—Cyrus S. Hapgood

[57] ABSTRACT

In the production of pulp, the amount of ballast in the white liquor is reduced by maintaining the concentration of the green liquor, prior to causticizing thereof to convert it to the white liquor used for cooking the wood, at a level of 110±20 grams per liter total titratable alkali counted as NaOH, maintaining the efficiency of the causticizing operation at 92±3%, and concentrating the white liquor, prior to the cooking, by evaporation to a content of 130–200 grams per liter efficient alkali counted as NaOH.

4 Claims, 1 Drawing Figure

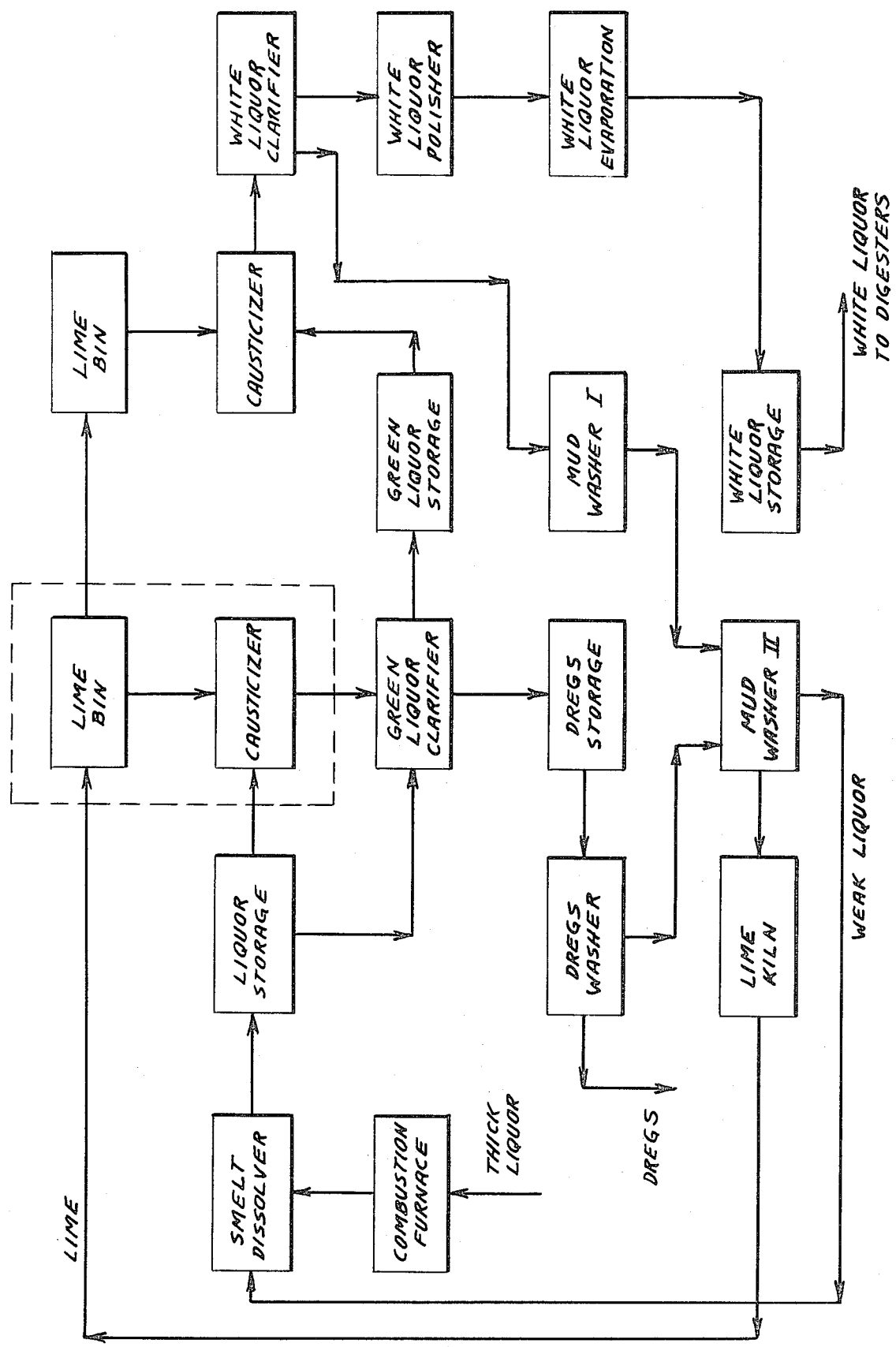

METHOD FOR PRODUCING PULP

The present invention relates to a method for reducing the problems with precipitation and deposits in pulp-producing apparatus, and for reducing the amount of ineffective compounds, usually called ballast, in the liquid system when producing pulp on the alkaline basis. The invention also relates to apparatus for carrying out the new method.

When producing pulp by the kraft process, a cellulose-containing material such as wood is cooked with white liquid in a digester. The white liquor is an alkaline liquor containing many chemical compounds, only some of which are effective during the cooking and contribute to liberating the cellulosic fibers from the rest of the wood substance. These effective compounds are sodium and potassium hydroxide and -sulfide. The liquor also contains compounds which are ineffective during the cooking and which in fact disturb the process, as they form deposits on the production apparatus and thereby diminish its effect. Among such compounds are Na- and K-compounds with carbonate, sulfate, sulfite and thiosulfate as well as Ca-, Fe-, Si-, and Al-compounds.

After the cooking, the pulp is washed and the used cooking liquor (the so-called black liquor containing the lignin products dissolved from the wood and the chemicals) is separated from the pulp. The cellulose pulp is cleaned and treated for further use.

The black liquor is evaporated in an evaporation plant, and the resulting thick liquor is burned in a furnace. During the burning, the sodium compounds are converted into sodium carbonate and sodium sulfide, which compounds are dissolved in a weak alkaline solution in a smelt dissolver and form the so-called green liquor.

The heat liberated during the combustion in the furnace is used in the process, particularly in the cooking and the evaporation plants. The green liquor is forwarded to the causticizing plant for cleaning and for converting most of the Na- and K-carbonate to Na- and K-hydroxide. After the causticizing, the green liquor is called white liquor and is used for cooking the pulp. The calcium oxide used for the causticizing is converted into calcium carbonate, lime mud. The lime mud is re-burned in a lime kiln and calcium oxide is formed again.

During the cooking and evaporation stages, chemicals are often precipitated and form deposits on several areas. The deposits have a varying chemical composition and may be composed of carbonate and/or sulfate of calcium, potassium and sodium as well as complex compounds of sodium-aluminum-silica and sodium carbonate. These deposits may form on the strainer systems in the digesters, in the preheaters, in the circulation systems and on temperature indicating devices. The deposits disturb the cooking process, both as regards quality and quantity. When deposits occur, the consumption of steam is increased and the yield is lowered. It is often necessary to take some digester capacity out of operation for cleaning. Deposits also occur on the heat surfaces in the evaporation plant. Deposits in the evaporation plant diminish the evaporation capacity and increase the heat amount needed per ton of evaporated water. Deposits also occur in the thick liquor tanks.

There are many reasons for deposits and precipitations on the processing equipment. Certain amounts of ineffective chemicals enter the system with the cellulosic material, the process water, make-up chemicals, foam-inhibiting agents or other process chemicals. When the plants are closed for environmental or other reasons, there is usually less possibility to take away or keep these chemicals at such a low level that the production apparatus works undisturbed. The amount of ineffective chemicals is increased when some plants in the cycle cannot work in the best possible way. If in the pulping, the chemicals or the wood or the used cellulosic material contains exceptionally large amounts of Ca- and Si-compounds, these compounds react with the carbonates present in the white liquor, if carbonate ions are available. If the black liquor contains too large amounts of ballast during the burning in the furnace, the combustion temperature is lowered and the desirable reactions do not take place in the right degree. The reduction of sodium sulfate to sodium sulfide is no longer optimal, which results in an increase of the ballast in the green and white liquor.

By use of the present invention, the problems with ballast in the cooking liquor and deposits on the processing apparatus may be diminished. This is achieved by keeping the concentration of the green liquor at a level of $110\pm20$ g/l total titrable alkali counted as NaOH before the causticizing plant, by keeping the causticizing efficiency of the white liquor at a level of $92\pm3\%$ and by concentrating the white liquor before the pulping by evaporation to a content of 130–200 g/l active alkali counted as NaOH which is suitable for the cooking.

By using a weak liquor in the causticizing plant, the NaOH-content in the weak liquor to the smelt dissolver is kept at a lower level. This means that a larger amount of silica compounds is separated off in the green liquor clarifier, due to the lower pH-level of the green liquor.

By the above-described method of the invention, the problems with precipitations of carbonate, sulfates and silica-aluminum-compounds in the cycle of the pulping industry are diminished. The evaporation of the thick liquor is facilitated due to the fact that the evaporation plant must take care of a smaller amount of chemicals. The smaller amount of chemicals also reduces the cooking point increase of the thick liquor.

The combustion furnace, according to the invention, will have a better heat economy and work better chemically, as the amount of inorganic chemicals can be lowered by 20% per ton of pulp. The reduction degree in the green and white liquor will be higher and the ballast of sulfur compounds will be lower.

According to the invention, the deposits on the processing equipment diminish, both as regards the deposits consisting of Ca- and Na-carbonate or sulfate and the deposits consisting of Si- and Al-compounds.

When the deposits on the process equipment consist mainly of carbonate and sulfate compounds, they can be avoided due to the fact that the green liquor concentration according to the invention is lower and better controlled than in common practice. Today, green liquor concentrations of $160\pm20$ g/l counted as NaOH are considered usual. According to the invention, a concentration of $110\pm20$ g/l is used instead.

According to the new method, the following two conditions must be fulfilled:

1. The green liquor concentration is maintained at a predetermined low value either in the smelt dissolver or in a tank between the dissolver and the green liquor clarifier. This is very important in the following causticizing stage.

2. The causticizing efficiency is increased to a level of 92±3%, whereby the content of dead load in the white liquor in an average plant is lowered from about 120 kg/t pulp to about 30 kg/t pulp. The formed white liquor must be concentrated by evaporation in order to obtain a suitable concentration for the cooking.

| Concentration of white liquor according to the prior art and chemicals needed for producing 1 ton unbleached pulp (90%) | |
| --- | --- |
| Total titratable alkali as NaOH | 160 g/l |
| Causticizing efficiency | 76% |
| Sulfidity | 28% |
| Reduction degree | 92% |
| Active alkali as NaOH | 132 g/l |
| Active alkali as NaOH | 400 kg/t pulp |
| White liquor | 3.03 m³/t pulp |
| Sodium carbonate in the white liquor | 112 kg/t pulp |

| Concentration of white liquor according to the invention (after evaporation) | |
| --- | --- |
| Total titratable alkali as NaOH | 147 g/l |
| Causticizing efficiency | 95% |
| Sulfidity | 27% |
| Active alkali as NaOH | 141 g/l |
| Active alkali as NaOH | 400 kg/t pulp |
| White liquor | 2.84 m³/t pulp |
| Need of evaporation, water from white liquor | 1.33 m³/t pulp |
| Sodium carbonate in the white liquor | 23 kg/t pulp |

The method described above is of great importance, for example, in plants using so-called "cross recovery systems".

If the problems also include the formation of deposits of silica and aluminum, the method described above may also be used, but the causticizing stage in this case must take place in two steps. It is usually difficult to remove silica compounds which have entered the system. By carrying through the causticizing in two steps, a number of silica compounds can be precipitated and removed from the process cycle. The lime mud from one of the causticizing steps is washed and burned in the usual way while the lime mud from the second causticizing step is washed and taken away from the plant and is disposed of or burned as garden lime, for example. As a rule, the lime mud from the second causticizing step contains most of the silica and should be disposed of.

The manner of carrying out the causticizing stage must be selected from case to case and is determined by the need to bleed off certain amounts of lime mud in order to keep the silica content in the white liquor at an acceptable level.

EXAMPLE

| Causticizing step 1 | |
| --- | --- |
| Need of alkali, active alkali as NaOH | 400 kg/t pulp |
| Causticizing efficiency | 76% |
| Sulfidity | 32% |
| Total titratable alkali | 100 g/l |
| Need of lime | |

| -continued | |
| --- | --- |
| (effective CaO) | 39 kg/m³ |
| Causticizing step 2 | |
| Causticizing efficiency | 95% |
| Sulfidity | 27% |
| Total titratable alkali | 100 g/l |
| Need of lime (effective CaO) | 10 kg/m³ |
| Total need of lime (effective CaO) | 204 kg/t pulp |

In the accompanying drawing, the single illustration is a flow chart of a method according to the invention, the elements surrounded by a broken line representing the two-step causticizing stage described below. The green liquor obtains a lower concentration in the smelt dissolver. It will be understood that the smelt dissolver is downstream from the combustion furnace which receives the thick liquor resulting from evaporation of the black liquor.

There is preferably a liquor storage tank with a stirrer between the smelt dissolver and the green liquor clarifier. This tank may have a volume of 0.5 m³ per ton produced pulp per 24h. In this way, the concentration of green liquor may be kept at the desired value with a variation of less than ±2 g/l. This is important for the following clarifying of the green liquor to obtain a more even causticizing process.

After the clarifying of the green liquor, there is usually a storage tank for the green liquor. This tank is preferably provided with a stirrer in order to equalize the concentration.

After the green liquor storage tank, there is a conventional causticizing stage with storage tanks in which the desired causticizing time is obtained. In this stage, the causticizing degree is selected depending on the kind of deposit problem.

If the precipitations consist mainly of carbonate and sulfate, a causticizing efficiency of 92±3% of the white liquor after the causticizing and clarifying stages is selected. The equipment may be conventional, but the temperature and holding time in the causticizers must be observed. The cleaned white liquor preferably passes a polisher before the evaporation stage and the white liquor storage.

If the deposits consist mainly of silica and aluminum compounds, the causticizing takes place in two steps as follows:

In step 1, the causticizing is effected to an efficiency of 60–85%, depending on the type and amount of contamination of silica and aluminum compounds and whether the first or the second lime mud is bled off. The causticizing equipment and the equipment for separating off lime mud may be conventional. If for practical reasons it has been chosen to bleed off the lime mud from the first causticizing step, it is of advantage to have a smaller storage tank between the smelt dissolver and the green liquor clarifier. In such an alternative, the first causticizing step may be inserted in front of the green liquor clarifier. In this arrangement, both dregs and lime mud which is to be bled off are separated and washed together.

The clarified "half-ready" white liquor is collected in a storage tank and forwarded to the second causticizing step where the causticizing is effected at a causticizing efficiency of 92±3% in a conventional equipment. The white liquor is thereafter led through a polisher.

The lime mud is washed and taken care of for burning in a lime kiln in the usual way. The white liquor obtained with the arrangement described above has a low concentration of about 110 g/l counted as total titratable alkali as NaOH and a causticizing efficiency of $92\pm3\%$. The white liquor is collected in a white liquor storage tank (not shown on the flow chart). From the latter storage tank, the white liquor is pumped to an evaporation plant for concentration to a suitable level, for example 140 g/l active alkali counted as NaOH. Sulfur gases from the evaporation plant are absorbed in a scrubber with the white liquor system. The condensate formed during the evaporation may be used for lime wash or in some other place in the plant.

The concentrated white liquor is stored in the storage tank before use in the digesters. The concentration may also take place in direct connection with the digestion.

It should be noted that a preferred form of the new method comprises the steps of clarifying the green liquor by sedimentation to recover precipitated contaminants, and maintaining the flow of green liquor to the clairfying step at a flow rate, alkali concentration and temperature which are substantially constant.

I claim:

1. In the production of pulp, the method comprising the steps of cooking a cellulose-containing material with an alkaline cooking liquor which is white liquor, the used cooking liquor from said cooking step being black liquor, separating said black liquor from the pulp produced in said cooking step, concentrating said black liquor by evaporation to form a thick liquor, burning said thick liquor in a recovery furnace to form a smelt, dissolving said smelt in a weak liquor to form green liquor, and passing said green liquor to a causticizing operation for cleaning and conversion to white liquor used in said cooking step, said method being characterized by further steps for reducing the amount of ballast in said white liquor, said further steps comprising maintaining the concentration of said green liquor prior to said causticizing operation at a level of $110\pm20$ grams per liter total titratable alkali counted as NaOH, maintaining the efficiency of said causticizing operation at $92\pm3\%$, and concentrating the white liquor, prior to said cooking step, by evaporation to a content of 130–200 grams per liter effective alkali counted as NaOH.

2. The method of claim 1, comprising also the step of clarifying the green liquor by sedimentation to remove precipitated contaminants, and maintaining the flow of green liquor to the clarifying step at a flow rate, alkali concentration and temperature which are substantially constant.

3. The method of claim 2, in which said weak liquor so dissolves the smelt that a substantial amount of silica compounds is removed from the green liquor in said clarifying step.

4. The method of claim 1, in which said causticizing efficiency of $92\pm3\%$ is obtained by carrying out the causticizing in two steps.

* * * * *